United States Patent Office 3,334,322
Patented Aug. 1, 1967

3,334,322
RESISTANCE THERMOMETER AND METHOD OF MAKING THE SAME
William Henry Bales, Bognor Regis, England, assignor to Rosemount Engineering Company Limited, a British company
Filed June 8, 1965, Ser. No. 462,279
Claims priority, application Great Britain, June 22, 1964, 25,754/64
4 Claims. (Cl. 338—28)

This invention relates to methods of encapsulating a wire network. According to this invention there is provided a method of encapsulating a wire network comprising applying to the network a liquid of high surface tension and low angle of contact such that the liquid is retained within the network after application, and causing the liquid retained within the network to set. The surface area of the liquid tends to shrink to a minimum and thus urges the network into a compact shape which is retained when the liquid is set. When the network is mounted on a nickel mandrel, the assembly may be heated in an oxygen containing gas to oxidise the exposed surface of the nickel before the liquid is applied.

The liquid is preferably an insulator, such as a glass/water mixture or glass/alcohol mixture. These mixtures contain glass particles in water, or alcohol, which, after stirring, is applied to the network. The liquid may be glass applied in its molten state.

The liquid is preferably applied to part only of the network and caused to set in a first stage and then liquid is applied to the remainder of the network and caused to set in a second stage. This two part operation enables adjustments to be made to the exposed wire after it has been given some strength by the first stage and before the eventual properties of the completed network are determined. Such adjustments include the adjustment of the resistance of a conducting network.

The invention includes within its scope an encapsulated wire network formed by the method as described above. The wire network is preferably mounted on a mandrel, before application of the liquid. The mandrel is preferably insulated, so that if two points on the network touch the mandrel, the mandrel does not form a short circuit between the points. The mandrel is preferably tubular, to reduce the weight and thermal capacity of the assembly. A convenient mandrel material is nickel, the surface of the nickel being oxidised to form an insulating layer.

The network is preferably a helix. The mandrel, if conducting, may form a return lead from one end of the helix. Alternatively, the helix may be double, so that both ends of the helix are located at one end of the assembly. Over the majority of its length, the helix is preferably spaced from the mandrel.

An example of the invention will now be described with reference to the accompanying drawings in which.

Figure 1:
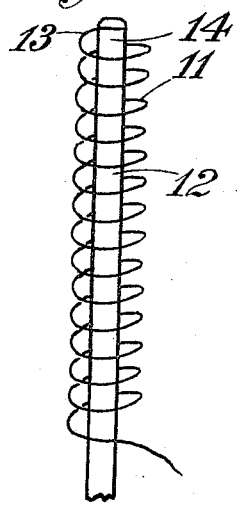
FIGURE 1 shows a resistance thermometer element before encapsulation.

Referring to the drawings, a resistance wire assembly comprises a platinum wire helix 11 wound loosely on a central nickel rod mandrel 12. The helix 11 is crimped at one end 13 on to one end 14 of the mandrel 12. The mandrel 12 provides a return lead from the end 13 of the helix 11 to adjacent its other end. The coil 11 is spaced from the mandrel 12 except at the end 13 where it is crimped to the mandrel.

Figure 2:
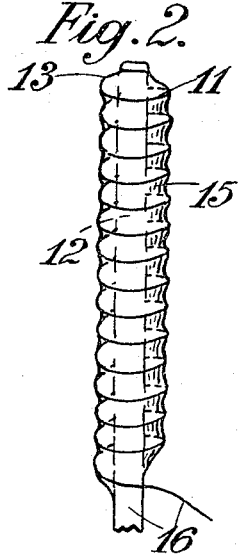
FIGURE 2 shows the assembly of FIGURE 1 after encapsulation.

A glass/water mixture 15 is painted on to the assembly as shown in FIGURE 2. This mixture is formed by powdered glass suspended in water. The surface tension of the mixture is such that the mixture is retained between the helix 11 and the mandrel 12 to retain the assembly in compact form. The conducting elements are covered by the glass/water mixture 15 except for the free ends 16 of the mandrel and the wire 11 which ends act as terminals for the thermometer element.

The painted assembly is heated so that the water evaporates and eventually the glass melts. The water has served its purpose in enabling the glass to be applied. The surface tension and angle of contact of the molten glass are such that the assembly is retained compact. The assembly is allowed to cool to form a permanent capsule of the element.

A part of the helix 11 may be left exposed by the mixture 15 in a first stage of operation, so that for example the exposed portion of the coil may be wound up on itself to reduce the total resistance of the element, and later encapsulated in the manner described above.

Capsules of down to 0.01 inch in diameter have been made. The encapsulated capsules have the advantage of greater robustness without an excessive increase in thermal capacity over unencapsulated networks. Small capsules produced in this way are suitable for fitting, for example, into normal medical hypodermic needles for temperature measurements on patients during operations. The capsule need not be generally cylindrical as shown. It can be formed in any suitable shape, such as part of a toroid.

I claim:

1. A method of making a resistance thermometer comprising the steps of forming a helical coil of wire having an electrical conductivity which changes with temperature, putting said helical coil loosely on a mandrel, applying to the helical wire a coating of an electrically-insulating liquid of high surface tension and low angle of contact so as to coat the wire on all its surface and so as to fill completely the region between the helical coil and the mandrel, and causing the coating material to set so as to form a rigid support for the helical wire.

2. A method as claimed in claim 1 wherein a nickel mandrel is used and wherein, before the coil is put on the mandrel, the mandrel is heated in an oxygen containing gas to oxidise the exposed surface of the mandrel.

3. A resistance thermometer comprising a nickel mandrel the surface of which is oxidized, a double-start helical coil of wire having an electrical conductivity which changes with temperature located over the mandrel, the internal bore of the helical coil being sufficiently greater than the external diameter of the mandrel to leave a space between the mandrel and the helical coil, and a glass coating over the helical coil, the glass filling the space between the helical coil and the mandrel to form a rigid support for the helical wire.

4. A resistance thermometer comprising an electrically conductive mandrel with an electrically insulating surface coating, a helical coil of wire having an electrical conductivity which changes with temperature located over the mandrel and connected thereto at one end, the internal bore of the helical coil being greater than the external diameter of the mandrel to leave space between the mandrel and the helical coil, and a glass coating over the helical coil, the glass filling the space between the helical coil and the mandrel to form a rigid support for the helical wire.

References Cited

UNITED STATES PATENTS

| | | | |
|---|---|---|---|
| 845,413 | 2/1907 | Haggn | 73—362 X |
| 2,425,032 | 8/1947 | Deyrup | 338—270 X |
| 2,957,153 | 10/1960 | Greenberg | 73—362 X |
| 2,972,180 | 2/1961 | Gulton | 317—261 X |
| 3,237,139 | 2/1966 | Werner | 338—28 X |

LEWIS H. MYERS, *Primary Examiner.*

E. GOLDBERG, *Assistant Examiner.*